(12) United States Patent
Tucker

(10) Patent No.: US 9,531,424 B1
(45) Date of Patent: Dec. 27, 2016

(54) MOBILE DEVICE CASE

(71) Applicant: Demetrius L. Tucker, Madison, TN (US)

(72) Inventor: Demetrius L. Tucker, Madison, TN (US)

(*) Notice: Subject to any disclaimer, the term of this patent is extended or adjusted under 35 U.S.C. 154(b) by 0 days.

(21) Appl. No.: 15/044,235

(22) Filed: Feb. 16, 2016

Related U.S. Application Data

(60) Provisional application No. 62/196,072, filed on Jul. 23, 2015.

(51) Int. Cl.
| | |
|---|---|
| *H04M 1/00* | (2006.01) |
| *H04B 1/3888* | (2015.01) |
| *A45C 11/00* | (2006.01) |
| *A45F 5/00* | (2006.01) |
| *H04M 1/02* | (2006.01) |

(52) U.S. Cl.
CPC ............ *H04B 1/3888* (2013.01); *A45C 11/00* (2013.01); *A45F 5/00* (2013.01); *H04M 1/02* (2013.01); *A45C 2011/002* (2013.01); *A45C 2011/003* (2013.01)

(58) Field of Classification Search
CPC . H04B 1/3888; A45C 11/00; A45C 2011/002; A45C 2011/003; A45F 5/00; H04M 1/02
USPC ....................... 455/566, 575.1, 575.3, 575.8, 90.3,455/550.1, 128, 347
See application file for complete search history.

(56) References Cited

U.S. PATENT DOCUMENTS

| | | | | |
|---|---|---|---|---|
| D406,592 S | * | 3/1999 | Richter ........................ | D14/253 |
| 5,988,572 A | * | 11/1999 | Chivallier ........... | B60R 11/0241 224/929 |
| 7,374,142 B2 | * | 5/2008 | Carnevali .............. | F16M 11/04 224/183 |
| 7,431,251 B2 | * | 10/2008 | Carnevali .............. | F16M 11/04 224/183 |
| D718,612 S | * | 12/2014 | McSweyn ...................... | D8/363 |
| 2012/0252543 A1 | * | 10/2012 | Cho ..................... | F16M 11/041 455/575.8 |
| 2012/0292466 A1 | * | 11/2012 | Song ..................... | F16B 47/003 248/205.4 |
| 2013/0109253 A1 | * | 5/2013 | Gammon ............... | F16M 11/10 439/883 |
| 2015/0207909 A1 | * | 7/2015 | Nielsen ................ | F16M 11/041 455/575.1 |
| 2015/0301560 A1 | * | 10/2015 | Garland, Sr. ........ | G03B 17/568 455/575.8 |
| 2015/0382489 A1 | * | 12/2015 | Sorensen .................. | G06F 1/16 248/558 |

\* cited by examiner

*Primary Examiner* — Babar Sarwar
(74) *Attorney, Agent, or Firm* — LaBatt, LLC

(57) ABSTRACT

Aspects of the invention provide a protective case for a mobile device. The protective case includes a cavity and a removable portion configured to be removably secured within the cavity. The removable portion can be removed and reinserted from the cavity to selectively expose either surface of the removable portion. A first surface of the removable portion can include a mechanism that can be used to mount the protective case, and therefore the mobile device, to a surface of a structure.

20 Claims, 4 Drawing Sheets

MOBILE DEVICE CASE

REFERENCE TO RELATED APPLICATIONS

The current application claims the benefit of U.S. Provisional Application No. 62/196,072, which was filed on 23 Jul. 2015, and which is hereby incorporated by reference.

TECHNICAL FIELD

The disclosure relates generally to mobile devices, and more particularly, to a protective case for a mobile device, such as a cellphone, tablet, and/or the like.

BACKGROUND ART

Mobile devices, such as cellphones, tablets, and/or the like, have become ubiquitous and are often carried nearly everywhere by individuals. Frequently, an individual has his/her mobile device when he/she is performing/going to perform an activity that requires the use of both hands and/or during which holding the mobile device can be cumbersome. During such an activity, the user may seek to utilize one or more functions provided by the mobile device. For example, a user can use a mobile device to listen to music, watch video, and/or the like, while exercising. The user may also simply want to keep the mobile phone close by while exercising in case of an emergency call. Other examples can include looking up directions while driving, watching a cooking video while making dinner, performing a home improvement task, and/or the like.

In all of these scenarios, a user may want to see the mobile device while performing an activity, but require the use of both hands in performing the desired activity.

SUMMARY OF THE INVENTION

Aspects of the invention provide a case for an electronic device, which includes a removable portion capable of having either surface of the removable portion facing outward. An embodiment of the case can provide a solution for temporarily attaching a mobile device, such as a cellphone, tablet, and/or the like, to a surface.

A first aspect of the invention provides a protective case comprising: a cavity; a removable portion configured to be removably secured within the cavity; and a means for removing and reinserting the removable portion from the cavity to expose either surface of the removable portion.

A second aspect of the invention provides a system comprising: a protective case including: a cavity; and a set of removable portions, each removable portion configured to be removably secured within the cavity with either surface of the removable portion selectively exposed, wherein at least one of the set of removable portions includes a surface including means for temporarily securing the protective case to a surface of a structure.

A third aspect of the invention provides a method of mounting an electronic device to a surface comprising: securing the electronic device in a protective case, the protective case including: a cavity; a removable portion configured to be removably secured within the cavity; and a set of grooves located adjacent to the cavity configured to allow a user to remove the removable portion; and removing and reinserting the removable portion in order to expose a first surface of the removable portion including means for temporarily securing the protective case to the surface; and mounting the protective case to the surface.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for temporarily attaching a mobile device, such as a mobile phone, a tablet, a timer, and/or the like, to a surface. As used herein, unless otherwise noted, the term "set" means one or more (i.e., at least one) and the phrase "any solution" means any now known or later developed solution.

Figure 1A:
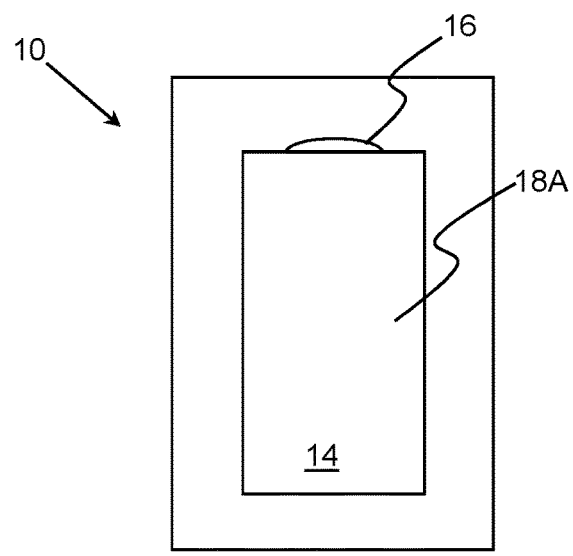
FIGS. 1A and 1B show an illustrative protective case for a mobile device according to an embodiment.
Figure 1B:
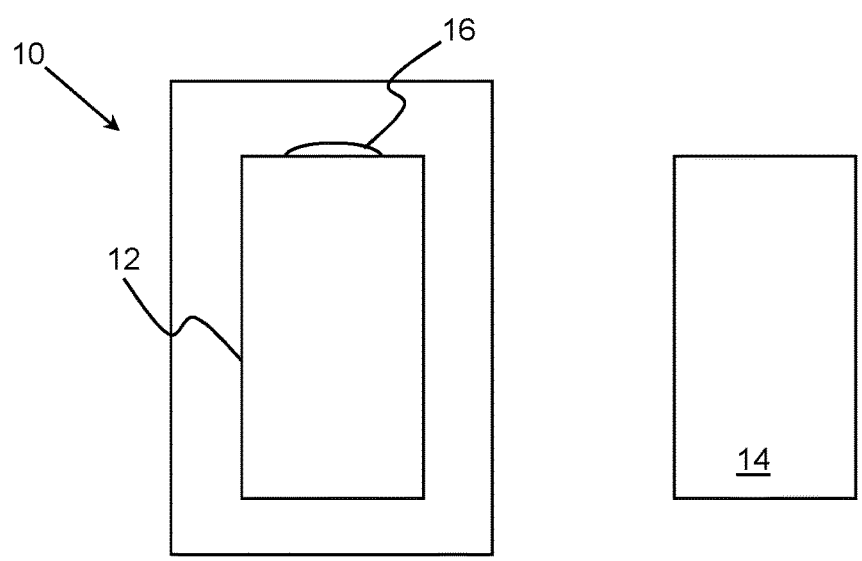

Turning now to FIGS. 1A and 1B, a back view of an illustrative protective case 10 for a mobile device, such as a mobile phone, tablet, and/or the like, according to an embodiment is shown. The protective case 10 can be made of any material that can provide protection to the mobile device within the case 10. Although the case 10 is shown in FIGS. 1A and 1B as rectangular, it is understood that the case 10 can be any shape. The back of the protective case 10 can include a cavity 12 that is configured to contain a removable portion 14. The removable portion 14 can be formed of a material that is substantially the same as the protective case 10. Alternatively, the removable portion 14 and the protective case 10 can be formed of different materials. Additionally, the removable portion 14 can be sized to fit entirely within the cavity 12. Although the cavity 12 and the removable portion 14 are shown in FIGS. 1A and 1B as rectangular shapes, it is understood that the cavity 12 and the removable portion 14 can be any shape, such as, a star, a circle, a square, a triangle, and/or the like.

The removable portion 14 can be removably attached to the protective case 10 and within the cavity 12 by a securing force generated using any solution. For example, the removable portion 14 and cavity 12 can be configured to hold the removable portion 14 in place by tension exerted on the removable portion 14 when located within the cavity 12. Alternatively, the removable portion 14 and/or cavity 12 can include one or more mechanisms for generating and exerting the securing force on the removable portion 14 to secure it within the cavity 12. For example, one of the removable portion 14 and cavity 12 can include a set of magnets embedded therein, while the other of the removable portion 14 and cavity 12 can include a material attracted to the magnetic force of the set of magnets. In this case, the magnetic force between the removable portion 14 and at least one surface of the cavity 12 can removably secure the removable portion 14 in the cavity 12. It is understood that the magnetic force can be applied from any combination of one or more of the five surfaces (e.g., four edges and bottom surface) of the cavity 12.

Figure 5A:
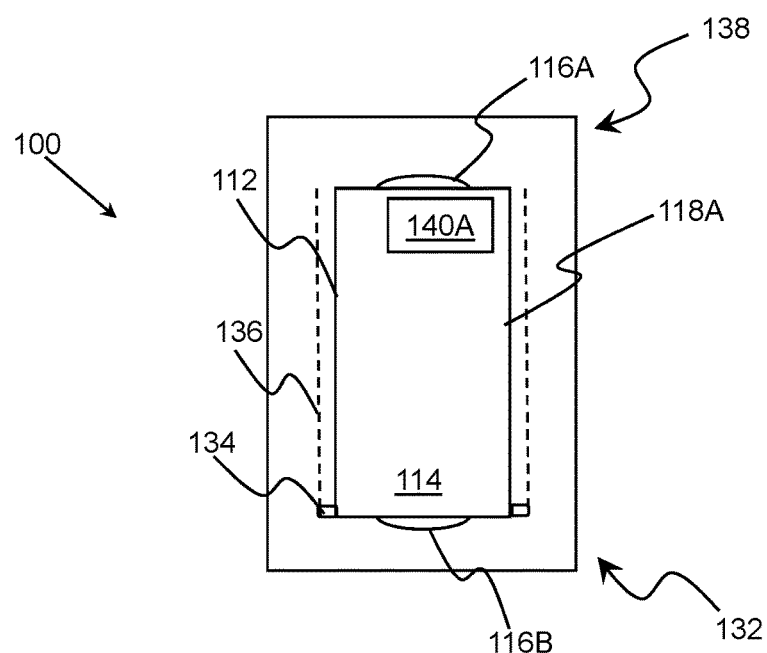
FIGS. 5A and 5B show an illustrative protective case for a mobile device according to an embodiment.
Figure 5B:
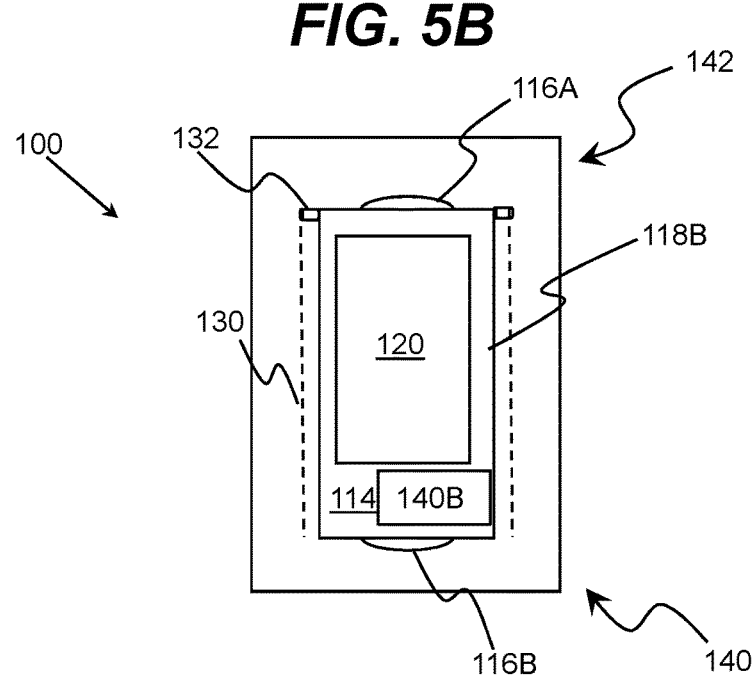

In an embodiment, the protective case 10 is configured to enable a user to remove the removable portion 14 from and insert the removable portion 14 into the cavity 12 while the mobile device is secured in the protective case 10. To this extent, the protective case 10 can further include a set of mechanisms to assist a user in removing the removable portion 14. For example, the protective case is shown including a groove 16 that is adjacent to the cavity 12. The groove 16 can comprise an indentation formed in the protective case 10 to expose a portion of a side of the removable portion 14 when it is secured in the cavity 12. It is understood that the groove 16 can include any shape. Further, it is understood that the case 10 can include any number of grooves 16. For example, in the embodiment shown in FIGS. 5A and 5B, a protective case 100 can include a first groove 116A and a second groove 116B, each located at an end of the cavity 112. Furthermore, although the grooves 16, 116A, 116B are shown at either ends of the cavities 12, 112, it is understood that the grooves 16, 116A, 116B can be located at any location adjacent to the cavity 12. A depth of the groove 16 can be at least as deep as a thickness of the removable portion 14. In this case, a user can exert a force on an edge of the removable portion 14 adjacent to the groove 16 to lift the removable portion 14 out of the cavity 12. However, it is understood that this is only illustrative of various solutions that can be implemented.

The removable portion 14 can be configured to be placed within the cavity 12 such that either side of the removable portion 14 is exposed to the back of the protective case 10. In this manner, the user can selectively decide which side of the removable portion 14 is exposed. In an embodiment, a first side 18A (FIG. 1A) of the removable portion 14 is configured to allow for easy gripping of the protective case 10 by the user, ready placement and removal of the protective case 10 from locations in which mounting is not desired, and/or the like, while a second side 18B (FIG. 2) of the removable portion 14 includes a mechanism for enabling the protective case 10, and the mobile device held therein, to be removably mounted to a surface. In this case, the mechanism and protective case 10 can be sized such that the mechanism does not contact the mobile device held within the protective case 10 when the corresponding surface of the removable portion 14 is facing inward. In an embodiment, the mechanism comprises an adhesive material embedded in or applied to at least a portion of the second side 18B of the removable portion 14.

In an illustrative embodiment, when a user of a mobile device secured within the protective case 10 wishes to have hands-free support for the mobile device, the user can insert a finger into the groove 16 to remove the removable portion 14. The securing (e.g., magnetic) force between the removable portion 14 and the cavity 12 should be strong enough so that the removable portion 14 does not fall out of the cavity 12, but not too strong to allow for the user to readily remove the removable portion 14. Once the removable portion 14 is removed from the cavity 12, the user can flip the removable portion 14 before reinserting the removable portion 14 into the cavity 12 such that the second side 15B with the securing mechanism is exposed.

Figure 2:
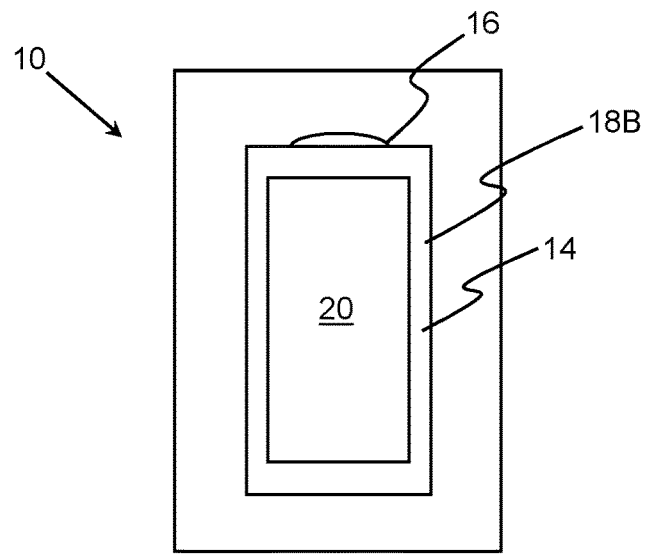
FIG. 2 shows an illustrative protective case for a mobile device according to an embodiment.
Figure 3:
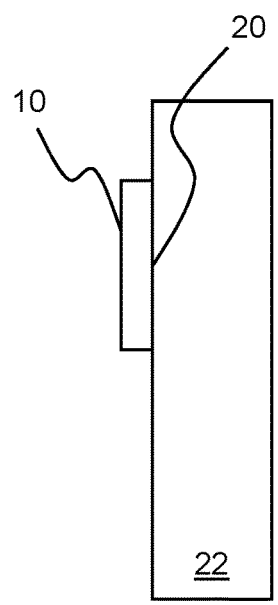
FIG. 3 shows a side view of an illustrative protective case for a mobile device mounted on a wall according to an embodiment.

Turning now to FIG. 2, the protective case 10 is shown with the second side 18B of the removable portion 14 now facing the outside of the protective case 10. The second side 18B is shown including a securing mechanism 20, such as an adhesive, a magnet, and/or the like, centrally located thereon. In an embodiment, the securing mechanism 20 can be formed of a removable adhesive, such as the Command™ Adhesive, and/or the like. Regardless, the securing mechanism 20 can be selected and sized to enable the securing mechanism 20 to secure the protective case 10 and mobile device secured therein in a desired location, such as on exercise equipment, on a wall, on a refrigerator, on a microwave, and/or the like. Turning now to FIG. 3, the securing mechanism 20 of the removable portion 14 can be configured to temporarily attach the protective case 10 (and the mobile device held within the protective case 10) to a surface 22 of a structure. For example, the surface 22 can comprise a substantially vertical surface (e.g., a wall, cabinet, shelve, and/or the like).

Figure 4A:
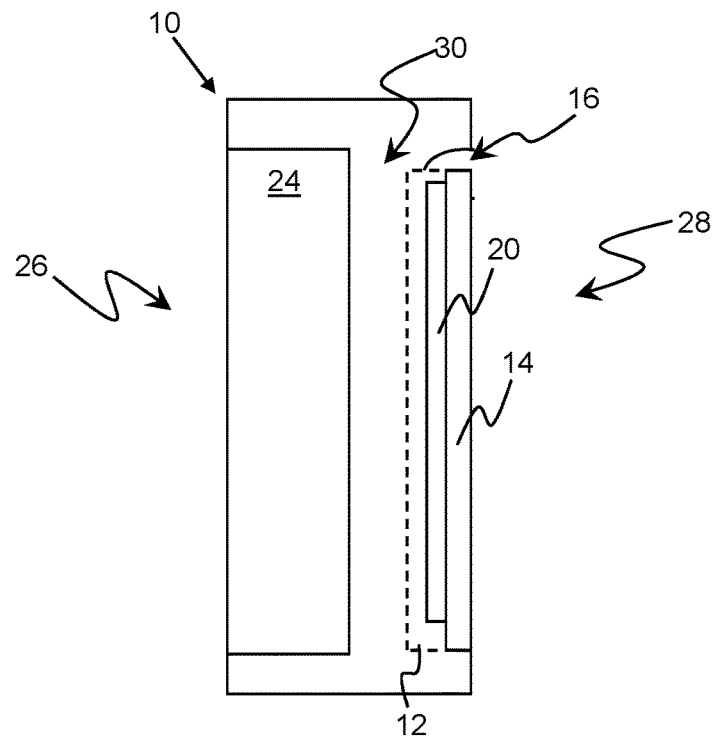
FIGS. 4A and 4B show an illustrative protective case for a mobile device according to an embodiment.
Figure 4B:
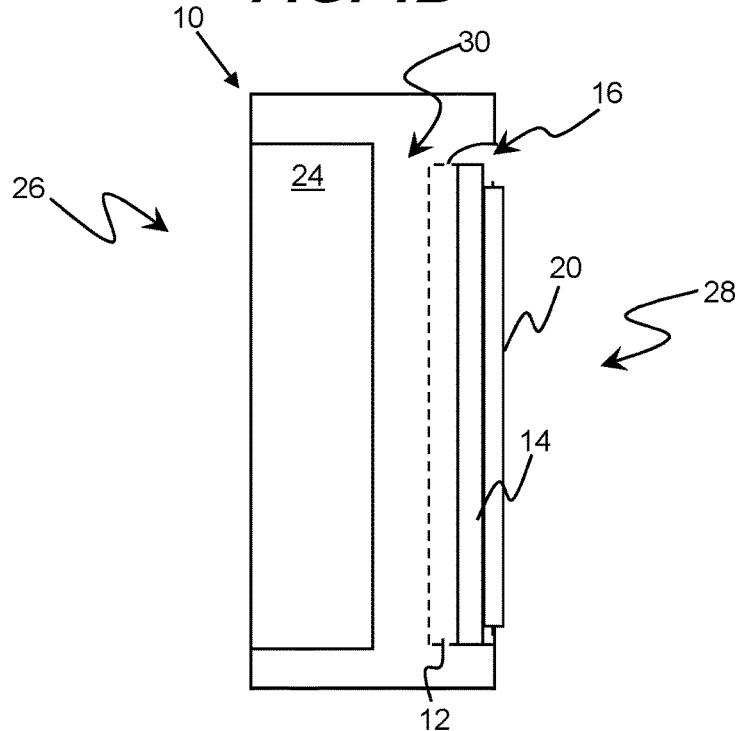

Turning now to FIGS. 4A and 4B, cut-away side views of an illustrative protective case 10 for a mobile device 24 according to an embodiment are shown. The mobile device 24 is located at the front 26 of the case 10, while the cavity 12 including the removable portion 14 is located at the back 28 of the case 10. It is understood that both the securing mechanism 20 and the removable portion 14 do not contact the mobile device 24 and that there is a space 30 between the cavity 12 and the mobile device 24. The space 30 can be formed of any material, such as air, a plastic material, an insulating material, and/or the like. In an embodiment, the space 30 can be the same material as the material of the protective case 10. In another embodiment, the space 30 can be formed of an insulating material that can protect the mobile device 24 if the securing mechanism 20 and/or the case 10 includes a magnet, e.g., to isolate the mobile device 24 from the magnetic field.

The removable portion 14 can be attached to the cavity 12 of the protective case 10 using any mechanism. In an embodiment, the removable portion 14 is configured to remain attached to the protective case 10 while allowing the user to selectively change the side 18A, 18B (FIGS. 1A and 2) of the removable portion 14 that is exposed. For example, turning now to FIGS. 5A and 5B, an illustrative protective case 100 according to an embodiment is shown. In this embodiment, the protective case 100 is similar to the protective case 10 shown in FIGS. 1A and 1B. However, a first end 132 of the removable portion 114 is attached to the cavity 112 on the back of the protective case 100 by a set of protrusions 134. The set of protrusions 134 are located on the end 132 of the removable portion 114 and each protrusion 134 can extend into a corresponding channel 136 located in the protective case 100 substantially along a length of the cavity 112.

When a user wishes to change a side of the removable portion 114 that is exposed, the user can insert a finger into a groove 116A, 116B located adjacent to the end without the set of protrusions 134 (e.g., a second end 138) to lift up that end of the removable portion 114. Then, the user can slide the set of protrusions 134 along the channels 136 so that the set of protrusions 134 move from one end (e.g., the first end 132) to the opposite end (e.g. the second end 138) of the cavity 112. The user can then reinsert the removable portion 114 into the cavity 112. As illustrated, the protective case 100 can include two grooves 116A, 116B, each located adjacent to opposing ends of the cavity 112 so that the user can lift the either end of the removable portion 114 in order to flip the removable portion 114 and expose the alternative side 118A, 118B. In an embodiment, each side 118A, 118B of the removable portion 114 can include a visual indicator 140A, 140B to provide a visual indication for the user as to which side 118A, 118B of the removable portion 114 should be lifted.

Although the embodiments discussed herein describe including a securing mechanism 20, 120 on one surface of the removable portion 14, 114, it is understood that this is only illustrative of various embodiments in which one of two surfaces can be selectively exposed. For example, in another embodiment, each side 18A, 18B, 118A, 118B can include a different graphic design, illustration, and/or the like, and a user can select which side 18A, 18B, 118A, 118B is visible on the protective case 10, 100. To this extent, one or both sides 18A, 18B, 118A, 118B of a removable portion 14, 114 described herein can include a mechanism for selectively placing a design thereon, such as a transparent pocket or the like.

In a further embodiment, a protective case 10, 100 described herein can be provided with multiple removable portions 14, 114. In this case, one of multiple removable portions 14, 114 can be utilized. For example, each of the plurality of removable portions 14, 114 can comprise a different mechanism (e.g., an adhesive, a magnet, and/or the like), for temporarily securing the protective case 10, 100 and device 24, 124 to a structure. Similarly, multiple removable portions 14, 114 can include the same mechanism. In this case, a removable portion 14, 114 can be discarded after a number of uses, e.g., when an adhesive surface is no longer sufficient to support the protective case 10, 100 and corresponding device. In a still further embodiment, a removable portion 14, 114 can be provided apart from the protective case 10, 100. In this case, a user can selectively obtain a desired removable portion 14, 114, e.g., having a particular securing mechanism, a particular surface design, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A protective case comprising:
a cavity;
a removable portion configured to be removably secured within the cavity; and
a means for removing the removable portion from the cavity and turning the removable portion before reinserting the removable portion into the cavity to expose either an exterior surface or an interior surface of the removable portion, wherein the interior surface of the removable portion includes a means for temporarily securing the protective case to a surface of a structure.

2. The protective case of claim 1, further comprising a set of grooves located adjacent to the cavity configured to allow a user to remove the removable portion.

3. The protective case of claim 1, further comprising a means for generating a securing force to removably secure the removable portion within the cavity.

4. The protective case of claim 3, wherein the securing force is a magnetic force between the removable portion and the cavity.

5. The protective case of claim 1, wherein the means for temporarily securing the protective case to the surface of the structure includes an adhesive material.

6. The protective case of claim 1, further comprising a visual indicator located on at least one of: the exterior or the interior surface of the removable portion.

7. The protective case of claim 1, wherein the removable portion includes a set of protrusions, each protrusion configured to extend into a corresponding channel located on a side of the cavity.

8. The protective case of claim 7, wherein the corresponding channel is located along an entire side of the cavity, such that the set of protrusions can slide along the corresponding channel.

9. The protective case of claim 8, further comprising a first groove located at a first end of the cavity and a second groove located at a second end of the cavity, wherein the first and second grooves are configured to allow a user to lift an end of the removable portion.

10. A system comprising:
a protective case including:
a cavity; and
a set of removable portions, each removable portion configured to be removably secured within the cavity with either an exterior surface or an interior surface of the removable portion selectively exposed, wherein the interior surface of at least one of the set of removable portions includes a means for temporarily securing the protective case to a surface of a structure.

11. The system of claim 10, wherein the means for temporarily securing includes an adhesive material.

12. The system of claim 10, wherein the protective case further comprises a set of grooves located adjacent to the cavity configured to allow a user to remove the removable portion.

13. The system of claim 10, further comprising a means for generating a securing force to removably secure the removable portion within the cavity.

14. The system of claim 13, wherein the securing force is a magnetic force between the removable portion and the cavity.

15. The system of claim 10, further comprising a visual indicator located on at least one of: the exterior surface or the interior surface of the removable portion.

16. The system of claim 10, wherein the removable portion includes a set of protrusions, each protrusion configured to extend into a corresponding channel located on at least one side of the cavity, wherein the corresponding channel is located along an entire side of the cavity, such that the set of protrusions can slide along the corresponding channel.

17. The system of claim 16, further comprising a first groove located at a first end of the cavity and a second groove located at a second end of the cavity, wherein the first and second grooves are configured to allow a user to lift an end of the removable portion.

18. A method of mounting an electronic device to a surface of a structure, the method comprising:
securing the electronic device in a protective case, the protective case including:
a cavity;
a removable portion configured to be removably secured within the cavity; and
a set of grooves located adjacent to the cavity configured to allow a user to remove the removable portion; and removing and reinserting the removable portion in order to expose an interior surface of the removable portion including means for temporarily securing the protective case to the surface; and mounting the protective case to the surface.

19. The method of claim 18, wherein removing and reinserting the removable portion includes:
   lifting the removable portion out of the cavity using at least one of the set of grooves; and
   reinserting the removable portion into the cavity, such that the interior surface including the means for temporarily securing is exposed.

20. The method of claim 18, wherein removing and reinserting the removable portion includes:
   lifting one side of the removable portion using one of the set of grooves;
   sliding an end of the removable portion including a set of protrusions extending from the end of the removable portion along a corresponding set of channels located along at least one side of the cavity; and
   reinserting the removable portion into the cavity, such that the interior surface including the means for temporarily securing is exposed.

* * * * *